United States Patent [19]

Adler

[11] Patent Number: 4,642,423
[45] Date of Patent: Feb. 10, 1987

[54] TOUCH CONTROL SYSTEM FOR USE WITH OR HAVING A THREE-DIMENSIONALLY CURVED TOUCH SURFACE

[75] Inventor: Robert Adler, Northfield, Ill.

[73] Assignee: Zenith Electronics Corporation, Glenview, Ill.

[21] Appl. No.: 771,324

[22] Filed: Aug. 30, 1985

[51] Int. Cl.[4] .............................................. G08C 21/00
[52] U.S. Cl. .................................. 178/18; 340/365 A
[58] Field of Search .............................. 178/18, 19, 20;
    340/365 R, 365 A, 706, 709; 367/138, 117, 127,
    907, 71, 72; 333/142; 310/313 A, 313 B, 313 C,
    313 D

[56] References Cited

U.S. PATENT DOCUMENTS

| | | | |
|---|---|---|---|
| 3,134,099 | 5/1965 | Woo | 340/347 |
| 3,653,031 | 3/1972 | Hlady et al. | 340/347 AD |
| 3,673,327 | 6/1972 | Johnson et al. | 178/18 |
| 3,684,828 | 8/1972 | Maher | 178/18 |
| 3,775,560 | 11/1973 | Ebeling et al. | 178/18 |
| 3,808,364 | 4/1974 | Veith | 178/19 |
| 3,883,831 | 5/1975 | Williamson et al. | 333/30 R |
| 3,916,099 | 10/1975 | Hlady | 178/18 |
| 3,956,745 | 5/1976 | Ellis | 340/337 |
| 3,978,437 | 8/1976 | Paige | 333/72 |
| 4,198,623 | 4/1980 | Misek et al. | 340/365 P |
| 4,254,333 | 3/1981 | Bergstrom | 250/221 |
| 4,286,289 | 8/1981 | Ottesen et al. | 358/125 |
| 4,346,376 | 8/1982 | Mallos | 340/712 |
| 4,403,165 | 9/1983 | Ballato et al. | 310/313 D |

OTHER PUBLICATIONS

"Use of Apodized Metal Gratings in Fabricating Low Cost Quartz RAC Filters", by G. W. Judd and J. L. Thoss—1980 Ultrasonics Symposium-343.

"Amplitude Weighting of SAW Reflecting Array-Structures", by F. G. Marshall, E. G. S. Paige & A. S. Young,—1974 Ultrasonics Symposium-202.

Primary Examiner—Stafford D. Schreyer
Attorney, Agent, or Firm—Cornelius J. O'Connor

[57] ABSTRACT

Apparatus for use in a touch control system for a cathode ray tube, display panel or other touch-controlled device which is capable of recognizing touch positions along a predetermined coordinate axis on a curved touch surface comprises a substrate comprising a sector of a three dimensionally curved surface having a touch surface capable of propagating surface acoustic waves such that a touch on that surface causes a perturbation of a surface wave propagating through the region of the touch. An input surface wave transducer mechanically and acoustically coupled to the touch surface of the substrate, upon excitation launches a burst of surface acoustic waves on the touch surface along a first path which represents a great circle on that surface. The apparatus also includes an array of surface wave reflective elements which are disposed in or on the touch surface of the substrate along the aforesaid first path for directing wave components derived from the burst across the touch surface of the substrate in a progression of transverse paths which intersect the coordinate axis of that surface.

17 Claims, 11 Drawing Figures

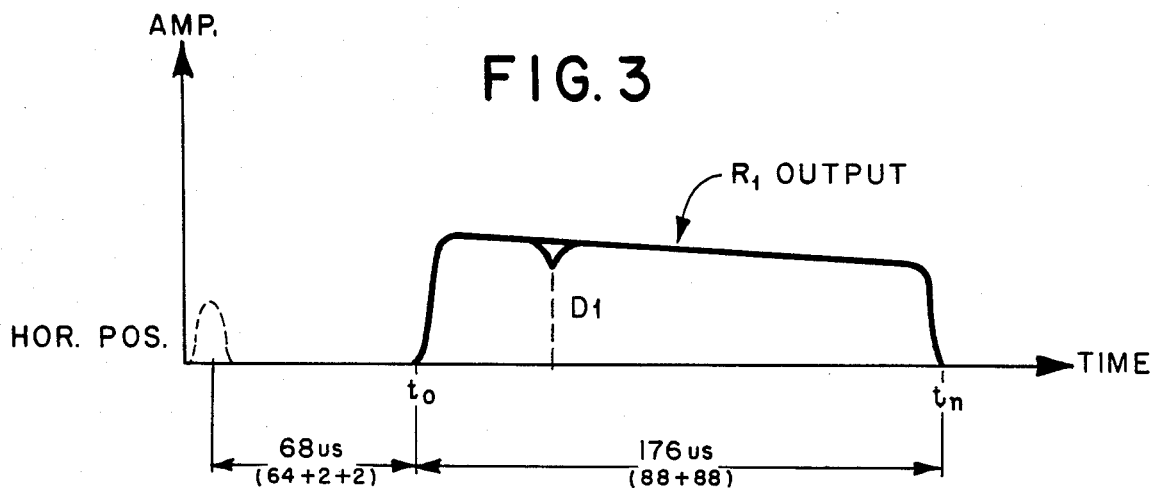
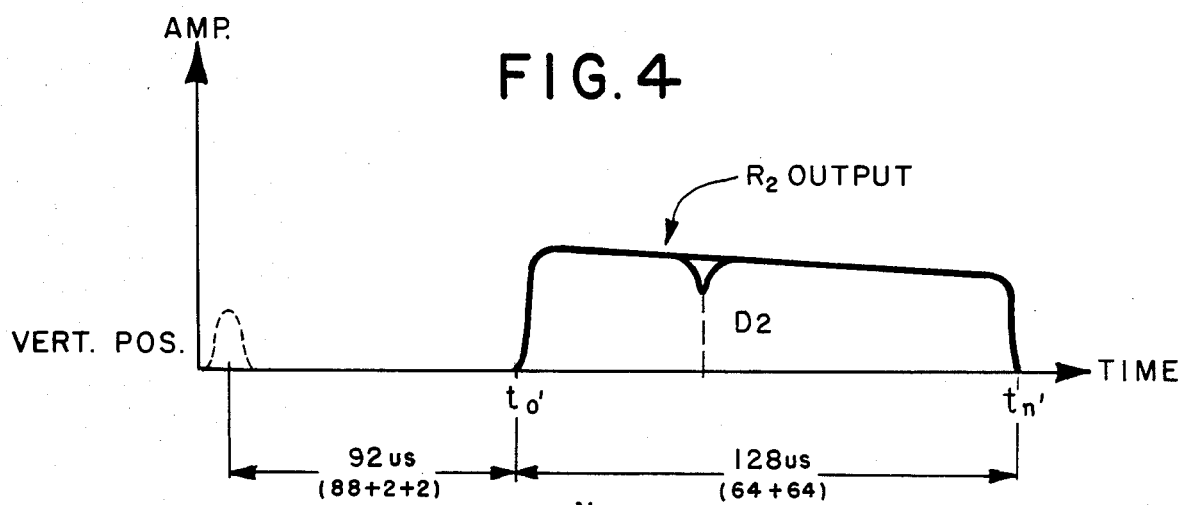
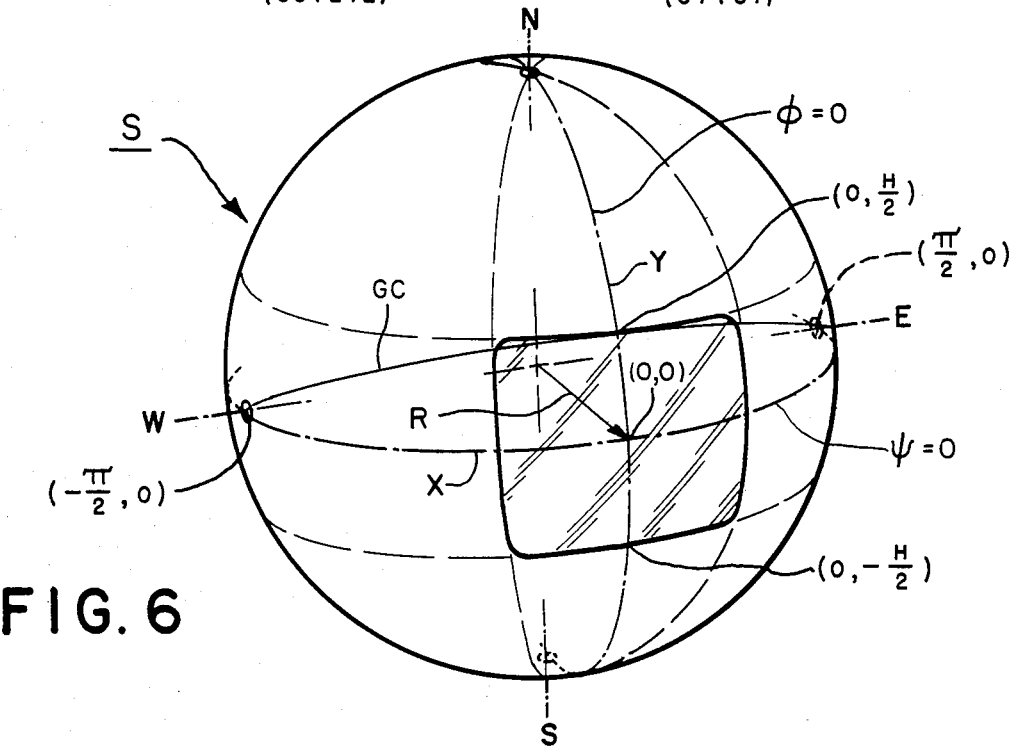

TOUCH CONTROL SYSTEM FOR USE WITH OR HAVING A THREE-DIMENSIONALLY CURVED TOUCH SURFACE

CROSS-REFERENCE TO RELATED APPLICATION

This application is related to but is not dependent upon copending application Ser. No. 698,306, filed Feb. 5, 1985 in the name of Robert Adler, copending application Ser. No. 715,134 filed Mar. 22, 1985 in the names of Michael C. Brenner and James J. Fitzgibbon and copending application Ser. No. 741,975 filed June 6, 1985 in the name of Robert Adler.

BACKGROUND OF THE INVENTION

This invention relates, in general, to a touch control system for a cathode ray tube (CRT), display panel or other touch-controlled device which is capable of recognizing touch positions along a predetermined coordinate axis on a touch surface.

By way of background, in a well-known prior art touch control system adapted for use with a CRT type graphics display device, each of two adjacent edges of the CRT's display surface (faceplate) is provided with a bank of light sources, usually light emitting diodes (LED's), arranged to develop a cluster of parallel light paths which extend across the faceplate, the clusters intersecting, preferably at right angles, to form a grid-type pattern of light paths overlying the display surface. Like banks of light detectors flank those sides of the faceplate opposite the banks of light sources.

In practice, a particular graphic is delivered for display upon the CRT faceplate by a controller in response to an operator's command, which command can take the form of a touching of one area of the faceplate. This touching serves to interrupt one or more of the light beams, which interruption causes the beam's assigned light detector to develop a signal which is applied to the controller to select a particular graphic. U.S. Pat. No. 3,775,560, for example, exemplifies this type of control for a graphics display device. A touch control arrangement of the type adverted to above tends to be rather costly since a separate sensor is employed for each light source.

It is known to use surface acoustic wave (SAW) energy for touch control. Prior art U.S. Pat. No. 3,134,099—Woo teaches an arrangement in which a plurality of piezoelectric transducers, electrically connected in parallel, is disposed along each of two adjacent edges of a sheet of glass. The transducers are coupled to the sheet and, in response to a control signal, create surface waves which propagate across the surface of the glass sheet. A writing pen, embodying a piezoelectric component, is placed in contact with the glass sheet to sense a propagating disturbance and then issue an appropriate signal to a control unit which measures the elapsed time interval between the time the control signal was applied to the transducer that initiated the disturbance and the time the signal was received by the pen. It is of significance that, in the Woo arrangement, a plurality of piezoelectric transducers is required of each of two adjacent sides of the glass panel. Further, the Woo system requires the use of a special touch stylus capable of sensing surface acoustic waves traveling across the panel.

U.S. Pat. No. 3,653,031—Hlady et al, is addressed to a touch sensitive position encoder also employing elastic surface wave generating transducers positioned along the edges of a sheet of transparent glass. The transducers function as radiators, as well as sensors, and thus serve to launch surface waves across the glass sheet, as well as to receive such waves. in operation, a finger or stylus placed at a particular position on the glass sheet serves to reflect the surface waves encountered. A reflected wave that is detected is applied to timing circuitry associated with the sensors, which circuitry determines the geometric coordinates of the position of the finger or stylus. Again, as in Woo, two arays, or banks, of transducers are required to create the surface waves that propagate across the glass sheet.

U.S. Pat. No. 3,673,327—Johnson et al, describes still another SAW-type touch responsive panel assembly comprising a panel positioned over the faceplate of a CRT and having a first plurality of transmitters positioned along a first edge of the panel for generating a like plurality of Rayleigh (surface) beams that propagate across the surface of the panel in an X direction and a like plurality of detectors positioned along the edge of the panel opposite said first edge for individually receiving an assigned one of said plurality of beams. In like fashion, a second plurality of transmitters is positioned along a second edge of the panel, adjacent the first edge, for simultaneously generating a second plurality of Rayleigh wave beams that propagate across the panel in a Y direction, perpendicular to the X direction. A like second plurality of detectors is positioned along the edge of the panel opposite said second edge for receiving an assigned one of said second plurality of beams. Accordingly, to establish this X-Y grid of wave beams, a transmitter is required for each wave beam and a separate detector is required for each such transmitter.

Each transmitter, upon actuation, launches a beam of Rayleigh surface waves along the surface of the panel. Thereafter, when a finger or other object is pressed against the panel, acoustical wave energy is absorbed, thereby interrupting its transmission to its assigned detector. The absence or reduction of the normal signal at a specific detector constitutes a touch indication which is applied to a computer.

However, a principal drawback of the Johnson et al touch control system, like that of its optical counterpart, resides in the requirement of a multiplicity of transmitters and detectors to establish the intersecting wave energy paths the form the grid overlying the panel. The mechanical consideration and cost involved in the practice of utilizing dual pluralities of transmitters and detectors, all of which must be separately wired, are obvious shortcomings.

Other patents in the touch control art are set forth below: U.S. Pat. Nos. 3,775,560; 3,808,364; 3,916,099; 3,956,745; 4,198,623; 4,254,333; 4,286,289; 4,346,376.

Additionally, art in the field of surface acoustic waves which was considered included: U.S. Pat. Nos. 3,883,831; 3,978;437; 4,403,165.

"Use of Apodized Metal Gratings in Fabricating Low Cost Quartz RAC Filters" by G. W. Judd and J. L. Thoss, Proceedings of the IEEE 1980 Ultrasonics Symposium, p.343.

"Amplitude Weighting of SAW Reflecting Array Structures" by F. G. Marshall, E. G. S. Paige and A. S. Young, IEEE 1974 Ultrasonics Symposium, p. 202.

OBJECTS OF THE INVENTION

It is a general object of the invention to provide an improved touch control system for use with a three dimensionally curved touch surface.

It is another object to provide a low cost, compact and highly effective surface acoustic wave touch control system capable of use with a three dimensionally curved touch surface.

It is another object to provide such a system which is efficient in its use of surface acoustic wave energy.

It is yet another object to provide such a system which is efficient in its utilization of touch surface area.

It is still another object to provide such a system which is readily adaptable for use with a cathode ray tube having a three dimensionally curved faceplate surface, which CRT system is low in cost, compact, and highly efficient in it use of surface acoustic wave energy and screen area.

BRIEF DESCRIPTION OF THE DRAWINGS

The features of the present invention believed to be novel are set forth with particularity in the appended claims. The invention together with further objects and advantages thereof, may best be understood by reference to the following description taken in conjunction with the accompanying drawings, in the several figures of which like reference numerals identify like elements, and in which:

FIG. 3 is a graphical plot representative of received surface acoustic wave energy traversing one coordinate of the faceplate touch surface shown in FIG. 2;

FIG. 4 is a graphical plot representative of received surface acoustic wave energy traversing a second, orthogonal, coordinate of the faceplate touch surface shown in FIG. 2;

FIG. 6 is an illustrative depiction of the great circle path which an acoustic surface wave tends to follow across a spherical surface;

The present invention has widespread applicability for use with, or incorporation into, cathode ray tubes, display panels and a variety of other controlled devices with and without displays. A preferred touch control system implementing the teachings of the invention has the system incorporated into a CRT display.

As will be described, the system may include a separate substrate defining the touch surface. In the illustrated preferred embodiment to be described, however, the CRT faceplate serves as the substrate defining the touch surface. Thus the controlled device (the CRT display) and the control system are inseparably integrated.

Figure 1:
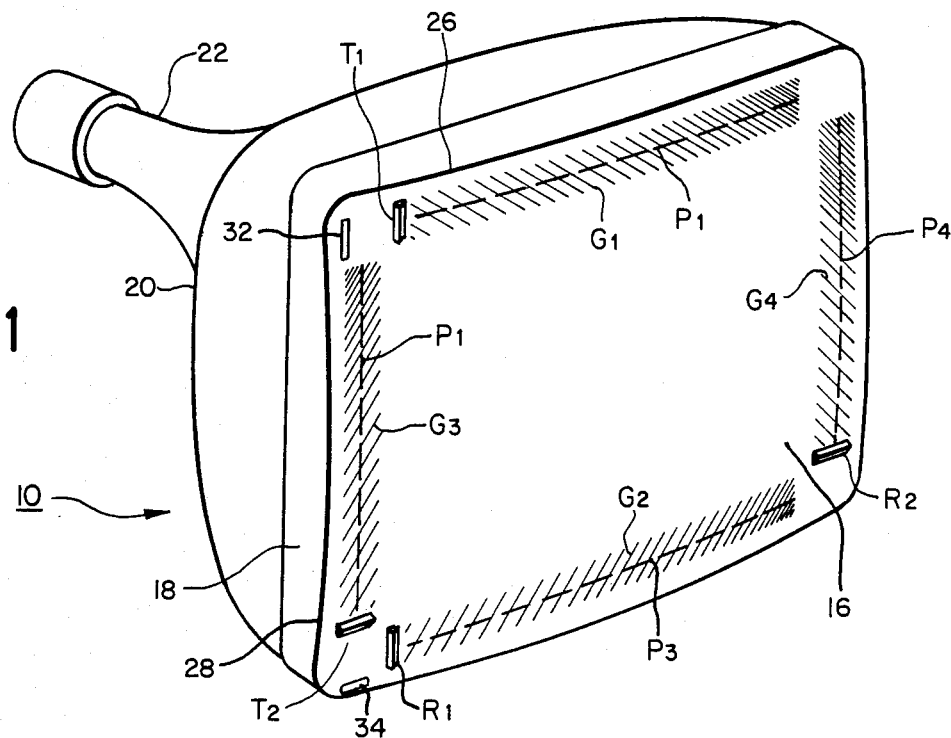
FIG. 1 is a perspective view of a cathode ray tube apparatus constructed in accordance with the invention.
Figure 2:
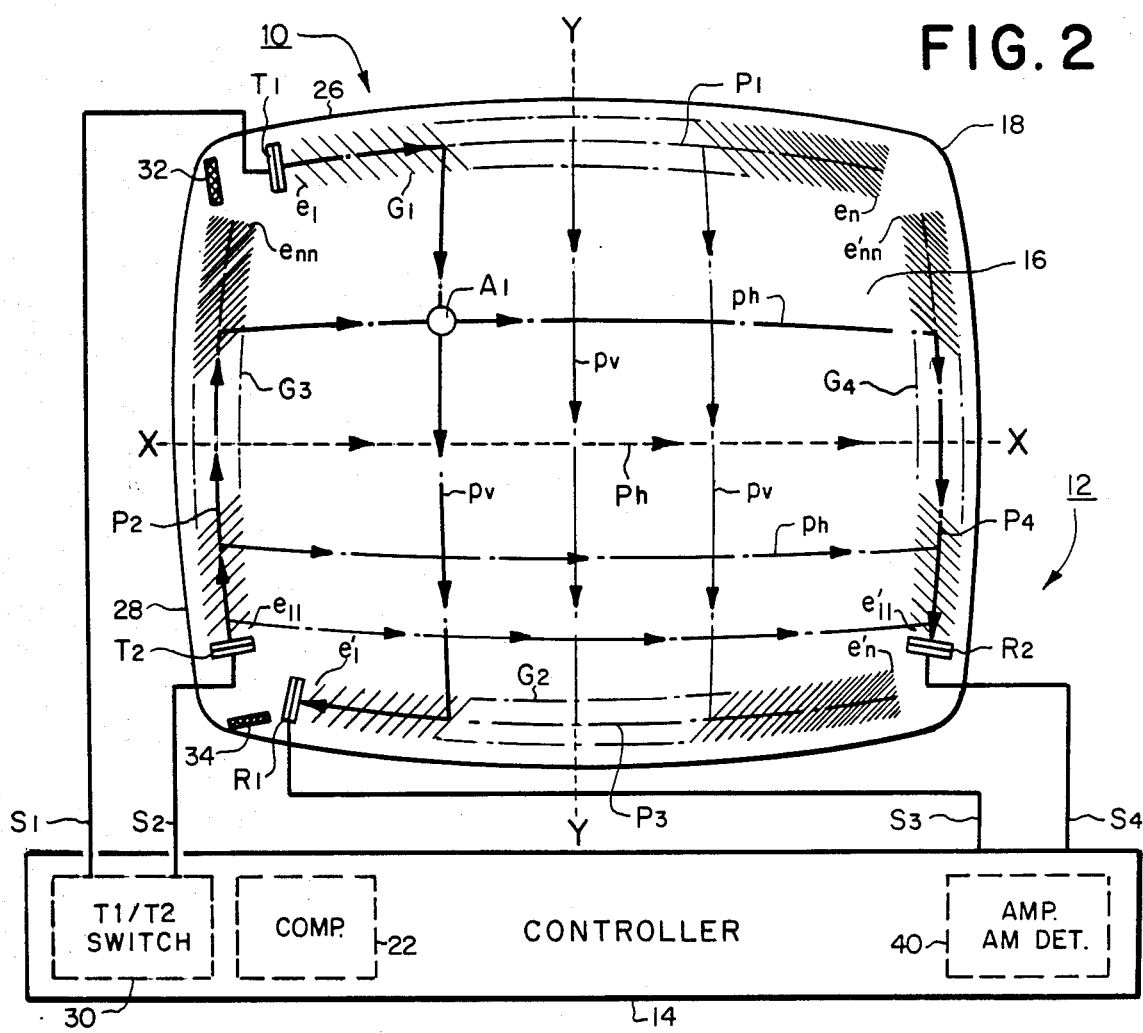
FIG. 2 depicts a spherically surfaced faceplate of a CRT in elevation.

The illustrated preferred embodiment comprises a novel cathode ray tube (CRT) apparatus 10; see FIGS. 1 and 2. A touch control system 12 according to this invention has a controller 14, subsequently to be described. The system is capable of recognizing touch positions along two predetermined orthogonal coordinate axes (X-Y) on a touch control surface 16, which, in this embodiment, constitutes the front surface of the CRT faceplate 18. For purposes to be explained below, the X-Y axes can be assumed to intersect the geometric center of touch surface 16. The controller 14 adverted to can be of the type described and claimed in copending application Ser. No. 715,134 filed Mar. 22, 1985 in the names of Michael Brenner and James Fitzgibbon. Accordingly, only as much of the Brenner et al disclosure as is pertinent to a complete understanding of an operative mode of the present invention will be presented hereinafter.

As shown in FIG. 1, the touch control surface 16 is defined by the CRT faceplate, hereinafter at times termed the substrate. The substrate in turn, comprises a sector of a three dimensionally curved surface. In the preferred embodiment wherein the substrate is a CRT faceplate, the surface 16 may be substantially spherical or biradial. The surface 16 is capable of propagating surface acoustic waves such that a touch on that surface causes a perturbation of a surface wave propagating through the region of the touch. CRT apparatus 10 further comprises a funnel 20, the forward end of which may be frit sealed to faceplate 18. The distal end of funnel 20 terminates in a neck section 22 which encloses an electron gun structure (not shown).

Graphics or other information may be ordered up for display from controller 14 in response to an operator's command. The command can take the form of a touch of a particular area of a menu, or directory, exhibited behind the touch surface. As will be described below, the act of touching surface 16 causes a perturbation of a surface acoustic wave propagating through the region of the touch. In practice, in an X-Y execution of the system, the perturbation is manifested as an interruption or reduction of the wave energy directed along one or more paths that form a grid overlying surface 16. Moreover, in the manner described in the Brenner et al application, the pressure applied to the panel during the act of touching is utilized to produce a control effect. Detection and analysis of such a perturbation serves to identify the X, Y, or other coordinates of the touched area, which information, in turn, is determinative of an output from controller 14 which can be graphics delivered up for display, or some other response. Additionally, the level of pressure of the touch employed to induce the perturbation is subjected to an analysis by the Brenner et al system that can produce an additional control effect.

To this end, the controller 14 for touch control system 12, which is detailed in FIG. 5 and fully described below, includes a computer 22 for rendering associated circuitry operative in a predetermined sequence so that when a touch-induced perturbation of acoustic wave energy is detected, converted to an electrical signal and fed back to the computer, the location of the touch, as well as the touch pressure employed to induce the perturbation, are identifiable by the computer and converted to control signals containing information indicative of touch location and touch pressure. As will be shown, these signals are applied to a controlled device, which can be the CRT apparatus 10 adverted to above.

As shown in FIGS. 1 and 2, surface 16 of faceplate 18 supports a first pair of input and output surface wave transducer means T1, R1, respectively, and a second pair of input and output transducer means T2, R2, respectively. Input transducers (transmitters) T1, T2 are mechanically and acoustically coupled to faceplate surface 16 to the end that, when excited, they individually launch respective bursts of surface waves upon surface 16. Output transducers (receivers) R1, R2 are similarly coupled to surface 16 so that, upon receipt of surface wave energy, they issue individual electrical output signals. In a manner to be described below in connection with the explanation of controller 14, transducers T1, T2, when stimulated by firing signals, launch a timed succession of surface acoustic wave bursts so that the location of a subsequent perturbation of a surface wave component is identifiable. Input transducers T1, T2, which are more particularly described below, are mounted upon touch surface 16 adjacent to edges 26 and 28, respectively; see FIG. 2. A source T1/T2 switch 30 associated with controller 14 serves to apply the timed input firing signals S1, S2 to respective transducers T1, T2 enabling them, in response to such signals, to individually launch bursts of acoustic surface waves along first and second paths P1, P2, respectively, which paths represent "great circles" on touch surface 16. A "great circle" is an imaginary line on a spherical surface which lies in a plane intersecting the center of curvature of the surface. A surface acoustic wave propagating on a spherical surface will follow a great circle. As used herein, the term "great circle" means the natural path taken by a surface acoustic wave propagating freely over a spherical, biradial or other three-dimensionally curved surface.

Also as shown in FIG. 2, the output transducers R1, R2 are mounted upon surface 16 at the termini of paths P3 and P4, which paths also represent great circles on surface 16. In a manner to be detailed below, transducers R1, R2, upon receipt of surface waves that experienced a touch-induced perturbation, will develop respective uniquely shaped output signals S3, S4 which, when analyzed by controller 14, exhibit a first characteristic indicative of the position, or location of the touch on the substrate surface and a second characteristic indicative of the touch pressure.

Initially, by way of background, a series of wave reflective gratings will be described in a generalized fashion. This introductory description is for the purpose of relating the manner in which touch control is accomplished by recourse to surface acoustic wave technology. However, since the invention contemplates apparatus for launching SAW's upon a curved surface, it is to be borne in mind that the configuration and orientation of the elements of the gratings will adopt specific formats to be detailed subsequently.

Accordingly, a first reflective grating G1 comprising an array of wave reflective elements $e_1-e_n$ is disposed along path P1 with each of the aforesaid elements effectively arranged at predetermined angles of incidence to the longitudinal axis of path P1. In one execution the angle of incidence of the reflective element at the midpoint of the array, relative to the axis of path P1, is approximately 45 degrees. In the case of acoustic wave propagation across a flat surface, all elements are disposed at 45 degrees to the path axis.

Reflective elements $e_1-e_n$ serve to extract from the initially launched surface wave burst a multiplicity of wave components and to direct such wave burst components across substrate surface 16 along a like multiplicity of paths $p_v$ each disposed at an angle to the axis of path P1. As best depicted in FIG. 2, these multiplicities of paths are so disposed as to intersect the coordinate axis X—X directed through the geometric center of surface 16 at 90 degrees.

A second reflective grating G2 likewise comprises an array of reflective elements $e_1'-e_n'$ which are disposed along path P3 and are effectively arranged at predetermined angles of incidence to the longitudinal axis of path P3 of intercepting the wave components extracted from the wave traversing path P1 and directed across surface 16 along the paths $p_v$. Grating G2 intercepts the wave burst components arriving along paths $p_v$ and redirects them along path P3 toward receiving transducer R1 which converts the wave energy in a received burst to an electrical output signal S3. In a fashion complementary to that of the first reflective grating G1, the elements of grating G2 are disposed at predetermined angles of incidence to the longitudinal axis of path P3 to facilitate interception and redirecting of wave components arriving from grating G1.

The above-described transducer pair T1, R1 and gratings G1, G2 serve to establish one portion of a grid of surface wave burst paths $p_v$ which are disposed across substrate surface 16. A second portion of that grid is established by the second pair of transducers T2, R2 and associated gratings G3, G4. In a manner similar to that described above transducer T2, in response to a firing signal S2, launches a burst of acoustic surface waves along the path P2. The third reflective grating G3 comprises an array of reflective elements $e_{11}-e_{nn}$ which are disposed along path P2 with the elements effectively arranged at predetermined angles of incidence to the axis of path P2. Grating G3 serves to extract from the surface wave launched by transducer T2 a multiplicity of wave burst components and to direct such wave burst components across substrate surface 16 along a multiplicity of paths $p_h$ each disposed so as to intersect the coordinate axis Y—Y, also directed through the geometric center of surface 16, at a 90 degree angle.

A fourth reflective grating G4, comprising an array of reflective elements $e'_{11}-e'_{nn}$ is disposed along path P4 with the mid-point element being arranged at a 45 degree angle to the longitudinal axis of path P4. The reflective elements of grating G4 intercept the wave components directed thereto by the elements of grating G3 along paths $p_h$ and redirect these intercepted wave burst components along path P4 to receiving transducer R2.

Since transducers T1, T2 additionally launch surface acoustic waves along paths P1, P2 in directions opposite from their respective adjoining gratings G1, G3, it is desirable to provide means for suppressing such undesired wave energy. Accordingly, to prevent transducers $T_1$, $T_2$ from generating undesired acoustic waves in directions opposite the intended directions, a pair of absorbers 32, 34 which can be formed of a soft epoxy, are mounted upon the display surface immediately behind respective transducers T1 and T2.

In the manner just described, and as depicted in FIG. 2, surface 16 is now provided with an overlying grid comprising a multiplicity of intersecting paths of acoustic surface wave bursts which surface waves follow great circle paths, with the central one of series $p_h$ being disposed coincident with coordinate axis X—X, i.e., the major axis of surface 16 while a second, intersecting series of great circle paths $p_v$ has the central one disposed coincident with the minor axis of the display surface. In this fashion intersecting wave energy paths traverse the surface of the display device, forming an invisible grid that overlies surface 16.

As will now be described, means are coupled to the input transducers T1, T2 for initiating the launching of bursts of surface waves along paths P1, P2. The application of signals S1, S2 to transducers T1, T2 serves to generate and launch across substrate surface 16 elastic (ultrasonic) surface waves having a substantially planar wavefront with uniform amplitude and phase along lines parallel to the initiating transducer. Transducers T1, T2, (as well as R1 and R2) typically, are piezoelectric transducers comprised of a lead zirconate-titanate ceramic mounted upon a prism of lower velocity material, e.g., Lucite, which effects an efficient electromechanical coupling to substrate surface 16.

The generated surface waves launched along paths P1, P2 are eventually received by transducers R1, R2, respectively, and converted to electrical signals S3, S4. Means including an amplifier and AM detector 40, see FIG. 2, is coupled to the outputs of receiving transducers R1, R2 for determining, by an analysis based on the transit time of the perturbed surface wave burst, which of paths $p_h$, $p_v$ the touch-perturbed wave traversed and thereby establish the location of the touch along two coordinates of substrate 18. In a one-coordinate system, for example, in order to identify the X coordinate for the location of the path of a perturbed wave burst along the horizontal axis, as viewed in FIG. 2, the determining means is arranged to make a time analysis of the surface wave burst received by transducer R1. To this end, the determining means analysis commences at the instant input signal S1 is applied to transducer T1 to launch a surface wave. On the time scale of FIG. 3 there is plotted the earliest time an acoustic wave burst from transmitter T1 could arrive at receiver R1.

Assuming that the dimensions of the grid formed by gratings G1, G2 overlying substrate surface 16 are approximately 8"×11", and assuming further that the transit time required for a surface wave burst to travel from T1 to the first reflective element $e_1$ on path P1 is approximately 2 microseconds, as is the transit time required for the surface wave burst to travel to receiver R1 from element $e'_1$, to this is added the transit time of the surface wave from reflective element $e_1$ across the display surface 18 to element $e_n$, which is approximately 64 microseconds. Accordingly, the control system 14 will ignore any disturbance arriving within the first 68 microseconds immediately following the triggering of transmitter T1. Assuming for the moment, that no disturbance or perturbation of the initial surface wave launched by T1 is experienced, the output of transducer R2 might exhibit the solid line response shown in FIG. 3. Depicted therein is a waveform having a relatively constant amplitude extending for approximately 176 microseconds. This response is established by virtue of the fact that, for a period commencing at $t_o$, surface wave energy is continually received by the detector R1 for 176 microseconds, that is, until time $t_n$. The 176 microsecond interval is the approximate time required for a surface wave to traverse the entire length of reflective grating G1 and return along the length of reflective grating G2. In the absence of a perturbation, the output of receiver transducer R2, when analyzed by controller 14, will supply a signal to its computer 22 which is indicative of the fact that an uninterrupted burst of surface waves traversed substrate surface 16 without interference. The computer relays this information to controlled device 23 (CRT apparatus 10) which, in turn, maintains the pre-existing condition on the surface 16 undisturbed.

Assuming now that an operator wished to select a graphic other than that being displayed, a menu, such as a chart or other type of directory, would indicate which particular area of surface 16, should be touched to call up the desired graphic. Accordingly, assuming that the particular area is that designated A1 in FIG. 2, the operator then inserts his finger into the grid of intersecting surface waves by touching the surface 16 at A1, which action causes a portion of the acoustic surface wave energy traversing the touched area to be absorbed. This act of touching is best explained, and manifested, by reference again to FIG. 3 which depicts the effect upon the output waveform of R1 attributable to a perturbation of the surface wave traversing the display surface in the vicinity of area A1. This effect is manifested in the waveform as a dip D1 along the time axis which corresponds to the point where the operator touched surface 16. The depth and width of the dip are indicative of the pressure that the operator applied during his touch. Let us assume that the point of touch occurred approximately one-fourth of the distance along the major axis of the display surface commencing from the left side, as viewed in FIG. 2. As previously noted, it was assumed that the time entailed for a surface wave to travel the length of grating G1 was 88 microseconds. One-fourth of that time would be 22 microseconds. Adding to that number the 64 microseconds required for the wave to traverse the paths parallel to the minor axis of the surface, the 22 microseconds entailed in traversing a corresponding portion of array G2, and finally adding the 4 microseconds (2+2) initial and terminal transit times, the detector output waveform would indicate that a perturbation of the wave burst transmitted by T1 and subsequently received by R1, occurred approximately 112 microseconds (2+2+64+22+22) after the transmitter T1 launched the surface wave under consideration. This 112 microsecond interval is analyzed by computer 22 which informs the controller 14 that a perturbation was detected by reciever R1 at a particular instant in the time domain.

Preferably, a short time after T1 launched a surface wave a burst is launched by trasmitter T2 and reflected by gratings G3 and G4 to return the components of that wave to receiver R2. In the manner described above with reference to a perturbation detected by R1, the surface wave components now traversing a path $p_h$ parallel to the major axis of the display surface are detected by R2 which establishes, in like fashion, the occurrence and time when the aforementioned perturbation of the wave, manifested in FIG. 4 as dip D2, was experienced along the Y-axis. Again, the depth and width of D2 are indicative of touch pressure. Applying this time-related information to that developed relative to the other axis, the computer informs the controlled device of the coordinates of the perturbation (touching at A1) so that that device may deliver for display upon the CRT screen the particular graphics associated or assigned to the location at which the touching occurred.

It is recognized that simultaneous operations to identify both coordinates are possible, but the preferred mode of operation is to alternate between the two. The latter practice eliminates crosstalk problems and makes it possible to economize by switching certain circuit elements (e.g., a tuned amplifier) between coordinate identifying channels, instead of duplicating such elements.

The above-described gratings G1–G4 can be readily formed by a silk-screening technique in which a frit (solder glass) material is deposited in a selected pattern on surface 16. More particularly, while the actual element orientations and configurations for grating patterns employed on curved surfaces are described below, they may utilize, insofar as element spacing is concerned, a computer generated element deletion approach. Consider first a basic reflective linear array comprising a multiplicity of surface wave reflecting fingers (elements) of equal width, equally spaced and each disposed at approximately 45 degrees to the longitudinal axis of the path they define. Desirably, the spacing, or pitch, between adjacent elements should be one wavelength of the frequency of the burst of acoustic waves launched by the transmitting transducer. An acoustic wave traversing such an array in which the reflecting fingers are uniformly spaced will experience an exponential attenuation of power with distance so that little, if any, acoustic wave energy is available for reflection at the terminus of the array. Moreover, a uniform array of the type adverted to results, of necessity, in exponentially decreasing power density with distance in the reflected acoustic wave components directed across the display surface. In other words, the power density of the initially reflected wave components will be significantly greater than that of subsequently reflected wave components. Desirably, the reflected wave components traversing the display surface should be characterized by a substantially constant power density, as graphically depicted in FIGS. 3 and 4, otherwise those plots would depict an exponentially decreasing amplitude.

The desired constant power density of the reflected waves may be achieved by a patterned deletion of a grating's reflective elements in which the percentage of deleted elements decreases gradually from the launch point to the terminus of the grating. This results in a progressively increasing coefficient of reflectivity culminating in the desired constant power density.

A reflective grating tailored for the above-mentioned execution was designed from an initial array of approximately 300 equally spaced elements having a pitch (in the direction of wave propagation) of one wavelength of a four MHz acoustic wave. In practice, elements are selectively deleted to the end that the spacing between remaining adjacent elements in the grating is a multiple (in which "multiple" includes one) of the above-mentioned one wavelength. In the case under consideration, array elements are selectively deleted in accordance with the following formula: T,0190

In the above expression, $p$ is equal to the density of elements at coordinate x, where x is the distance measured from the far end of the array back toward the launch end. When x equals zero, element density is unity, which is the case for a uniform array with no elements deleted. C and L are constants, the values of which are determined by recourse to experimental data and depend upon the material properties of the display panel and the reflective elements, the length, width and thickness of the reflective elements, etc. The resulting grating comprised an array of approximately 130 elements having a pattern determined by the above formula and in which individual elements were 0.7" long and 0.011" wide.

The arrangement described serves to launch a burst of surface waves into a reflective array or grating from which is derived a plurality of burst components. The array redirects these components across the display surface. In a broader sense, CRT apparatus 10 may be thought of as comprising surface acoustic wave scanning means including input surface wave transducer means coupled to the surface wave propagating surface 16 for scanning the surface in the direction of the coordinate axis with a timed succession of surface wave bursts directed in substantially parallel paths across the surface transversely to the said coordinate axis. The plurality of paths are respectively associated with different positions along the coordinate axis of the display surface. As the touch position information is developed by timing the surface wave burst component which is perturbed, the starting time of each of the succession of surface wave bursts which are directed across the panel must be carefully controlled. As noted, timing is inherent in the propagation velocity of the surface wave burst as it travels through the reflective grating. Other CRT embodiments are contemplated wherein the launching of the bursts of surface waves or wave components along parallel paths across a substrate is determined by other than the natural propagation velocity of surface waves on surface 16. For example, in the embodiment wherein a reflective array such as is shown in FIG. 2 is used to launch the surface wave burst components across surface 16 the reflective array may be formed on a separate strip composed of a material having a different wave propagation velocity, such as a different glass or a metal, which is adhered to surface 16. Care must be taken to insure an efficient transition of the waves from the reflective grating onto the surface 16, as by feathering the interfacing edge of the strip. The wave reflective array may be formed on a separate strip for other reasons also, such as ease or economy of manufacture.

In a broad sense, the touch control system 12 utilizes an absorption ranging system, quite unlike the above-discussed reflection-type ranging system shown in the prior art U.S. Pat. No. 3,653,031. In the present invention, the absence of wave energy or the presence of wave energy at a reduced level, as results when a finger, or a stylus reasonably capable of absorbing acoustic surface wave energy, damps the amplitude of a surface wave burst propagating through the region of the touch, is sensed and the timing of that information is utilized to determine which of the plurality of burst propagation paths has been perturbed, and thus the location of the touch.

The manner in which controller 14 serves to generate and apply firing signals to substrate transducers T1 and T2 and, to analyze touch-perturbed surface wave components delivered by receiver transducers R1 and R2, will now be presented. See FIG. 5.

Figure 5:
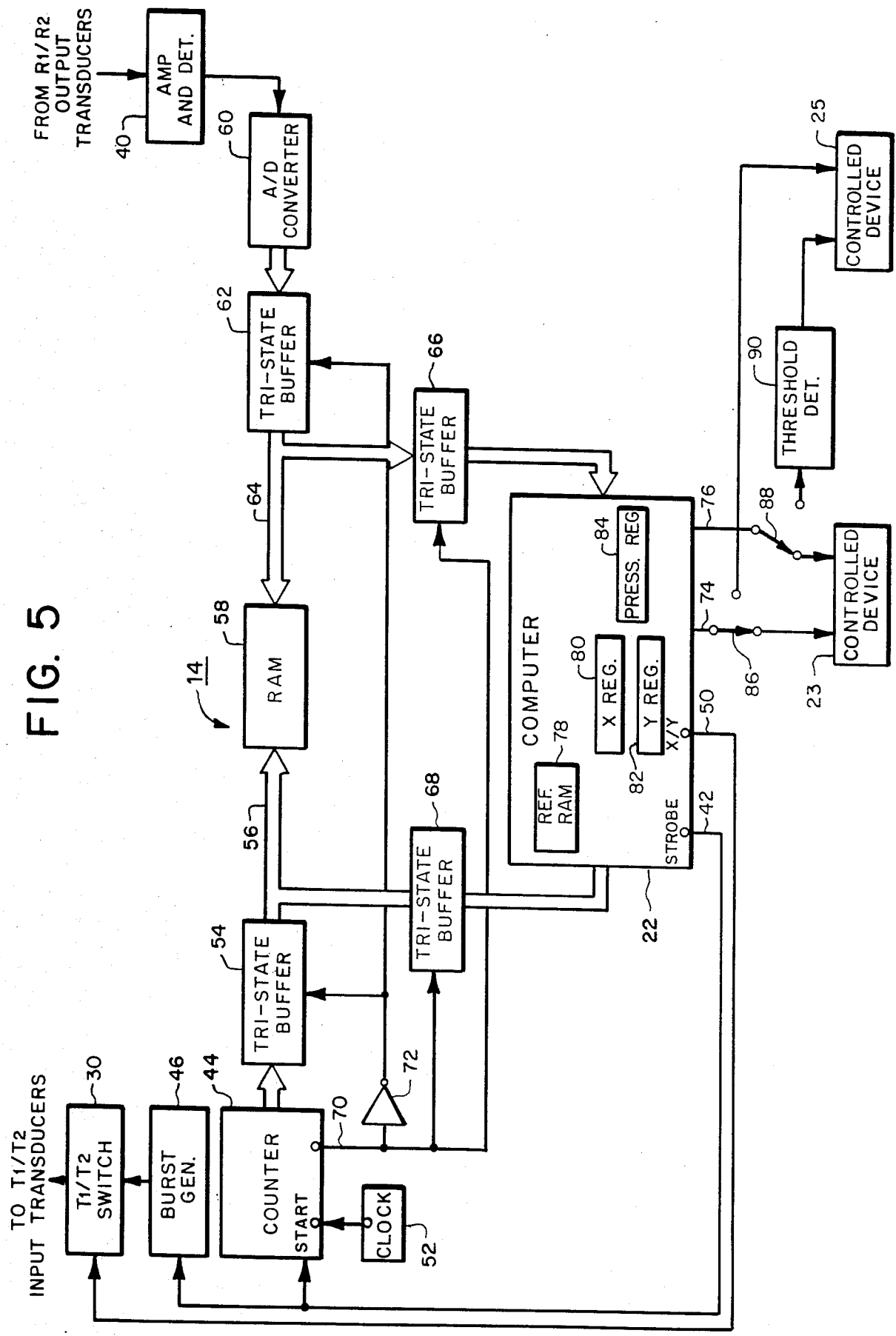
FIG. 5 is a block diagram of a touch panel control system for use with the cathode ray tube apparatus shown in FIGS. 1 and 2.

FIG. 5 comprises a block diagram of controller 14 which is connected between the input transducers T1, T2 and the output transducers R1 and R2. As will be explained in further detail hereinafter, controller 14 initiates the generation of properly timed surface acoustic waves across surface 16 of the faceplate 18 and processes the analog output signals S1, S2, produced in response thereto, graphically depicted in FIGS. 3 and 4, for deriving respective control signals containing information indicative of touch position and touch pressure.

More particularly, the controller 14 comprises the computer 22 having a strobe output terminal 42 connected to the start input of a counter 44 and to the inut of a burst generator 46. In response to a strobe signal, which defines the beginning of a memory "write" cycle, burst generator 46 generates a high frequency burst (for example, 16 to 24 cycles at 4 MHz) which is coupled to a T1/T2 (X/Y) switch 30 for application to the T1 and T2 transducers. The state of switch 30 is controlled by a bit developed on an X/Y output 50 of computer 22 such that the burst is alternately coupled to the X and Y transducers (T1/T2) for producing surface acoustic waves across the touch panel in the X and Y (as they are conventionally designated) directions. The strobe signal also enables counter 44 which begins counting clock pulses generated by a clock 52. The output of counter 44 comprises a sequence of address signals which are coupled by an enabled tri-state buffer 54 to an address bus 56 for application to the address input of a RAM 58. The amplitude modulated signal 53 or 54 developed by either the R1 or R2 output transducers in response to the high frequency burst is coupled by an amplifier and detector 40 to the input of an A/D converter 60. A/D converter 60 converts the analog input signal to a digital format, for example a six bit signal, the digital signal being coupled by a second enabled tri-state buffer 62 to a data bus 64 for application to the data input of RAM 58 as well as to the input of a third tri-state buffer 66 whose output is connected to the data input of computer 22. A fourth and final tri-state buffer 68 is coupled between an address output of computer 22 and data bus 56. During a memory "write" cycle initiated by a strobe pulse on output 42 of computer 22, buffers 66 and 68 are both disabled inhibiting the application of data to computer 22 via buffer 66 and the application of address signals from computer 22 to address bus 56 via buffer 68. Thus, during the memory "write" cycle a plurality of digital samples, e.g., 320, of the X or Y analog output signal are written into RAM 58 in response to the address signals from counter 44.

After counter 44 completes a full countng cycle, (i.e., 320 clock pulses) it is internally held in its final counting state and an output 70 thereof transitions from a logically low to a logically high state. This transition defines the end of a memory "write" cycle and the beginning of a memory "read" cycle. In particular, the logically high level on output 70 enables buffers 66 and 68 and is coupled through an inverter 72 for disabling previously enabled buffers 54 and 62. During the ensuing memory "read" cycle, address signals generated by computer 22 are therefore coupled through enabled buffer 68 to address bus 56 for reading the digital samples stored in RAM 58 onto data bus 64. The stored digital samples read onto data bus 64 are coupled through enabled buffer 66 to computer 22 which, as will be explained in further detail hereinafter, processes the data to develop two control signals on outputs 74 and 76 respectively representing the position and pressure of a touch on the touch panel substrate 18. After all of the samples stored in RAM 58 have been read into and processed by computer 22, another strobe pulse is developed on output 42 initiating a second memory "write" cycle, followed by another memory "read" cycle, and so on. It will be understood that the X/Y bit on output 50 toggles X/Y switch 30 during alternate memory "write" cycles so that surface waves are alternately generated in the X and Y directions.

In a preferred embodiment of the invention, the first two memory "write" cycles following power-up of computer 22 establish reference profiles of the analog output signal in both the X and Y directions against which subsequent outputs are compared to establish touch position and pressure. These reference profiles are stored in a reference RAM 78 of computer 22 during the memory "read" cycles following the first two memory "write" cycles.

During each subsequent memory "write" cycle, which is preferably accomplished at a relatively high speed (e.g., 4.0 mega-writes/sec) 320 digital samples representing either the X or Y output signal are written into RAM 58. The samples are subsequently transferred to computer 22 at a much slower rate (e.g., 250 kilo-reads/sec) for processing. Computer 22 is programmed for comparing each sample as it is received from RAM 58 with the corresponding reference sample stored in reference RAM 78. Any positive difference between a reference sample stored in RAM 78 and the value of the corresponding sample being read from RAM 58 exceeding a predetermined noise threshold represents a touch on the substrate surface 18.

The position or location of the touch on the surface 16 is established in relation to the memory locations in RAM 78 at which the differences in the X and Y directions were detected. The pressure of the touch is established in relation to the magnitude of the differences. In particular, it has been found useful to average the differences in the X and Y directions to represent the touch pressure. This average difference may conveniently be derived by dividing the sum of the X and Y differences by a factor of two. The derived touch location or position information is stored in an X-register 80 and Y-register 82 and developed on output 74 while the derived touch pressure information is stored in a pressure-register 84 and developed on output 76.

For purposes of illustration, the touch position and pressure information provided on outputs 74 and 76, respectively, of computer 22 are shown as being coupled through a pair of switches 86 and 88 to two controllable devices 23 and 25. With the switches in the positions shown in FIG. 5, both the position and pressure representative signals are applied to device 23. The signal on output 74 will thus provide touch position information to device 23 while the signal on output 76 will provide touch pressure information to device 23. Since the touch pressure information has a high degree of resolution, preferably comprising, for example, a six bit signal, it may be considered to be indicative of plural discrete non-zero levels of touch pressure, or a continuum of levels of touch pressure and thus effectively represent a continuously variable signal of the type useful for representing analog functions such as volume control and the like.

When switches 86 and 88 are switched to their other positions, touch position information is directly provided to another device 25 (which also can be a CRT of the type above described) while touch pressure information is coupled to the device through a threshold detector 90. Threshold detector 90 may, for example, be designed to provide an output to device 25 only when the pressure information on ouput 76 exceeds a selected threshold value. In this manner, an on/off type function of device 25 can be conveniently controlled in response to touch pressure. By way of example, in an application or embodiment wherein the system is configured as it appears when switches 86 and 88 couple the outputs on 74 and 76 to device 25, the system could be designed such that touch pressure above a predetermined noise threshold activates a display or indicator signalling the user that a certain function has been selected. Pressing harder on the faceplate surface causes a second threshold to be exceeded and the command to be "entered". As a second example, with the switches 86, 88 in the other position, an operative touch (above the noise threshold) might activate a display that depicts a particular device—pressing harder might then control the volume or output from that device.

RAY TRAJECTORIES ON A SPHERICAL SURFACE

As noted above, faceplate 18 is a constituent of a conventional color cathode ray tube, therefore its touch control (display) surface 16 will typically approximate a sector of a sphere and paths P1, P2, P3 and P4 will constitute great circles on that surface. Attention will now be addressed to the trajectory of a surface acoustic wave across such a surface(s). In practice, a conventional 13" color CRT has a utilizable faceplate having a length L=11", a height H=8" and a spherical radius R=22". It will be assumed that the sphere S in FIG. 6, from which that sector is derived, has a spherical radius R and that the geometric center of that sector coincides with the intersection of the sphere's equator, where latitude $\psi=0$, and the zero meridian where longitude $\phi=0$. A coordinat system for locating or defining a path upon the surface of the face panel is established by aligning the equator along the X-axis (+x is East) and the zero meridian along the Y-axis (+y is North).

Figure 7:
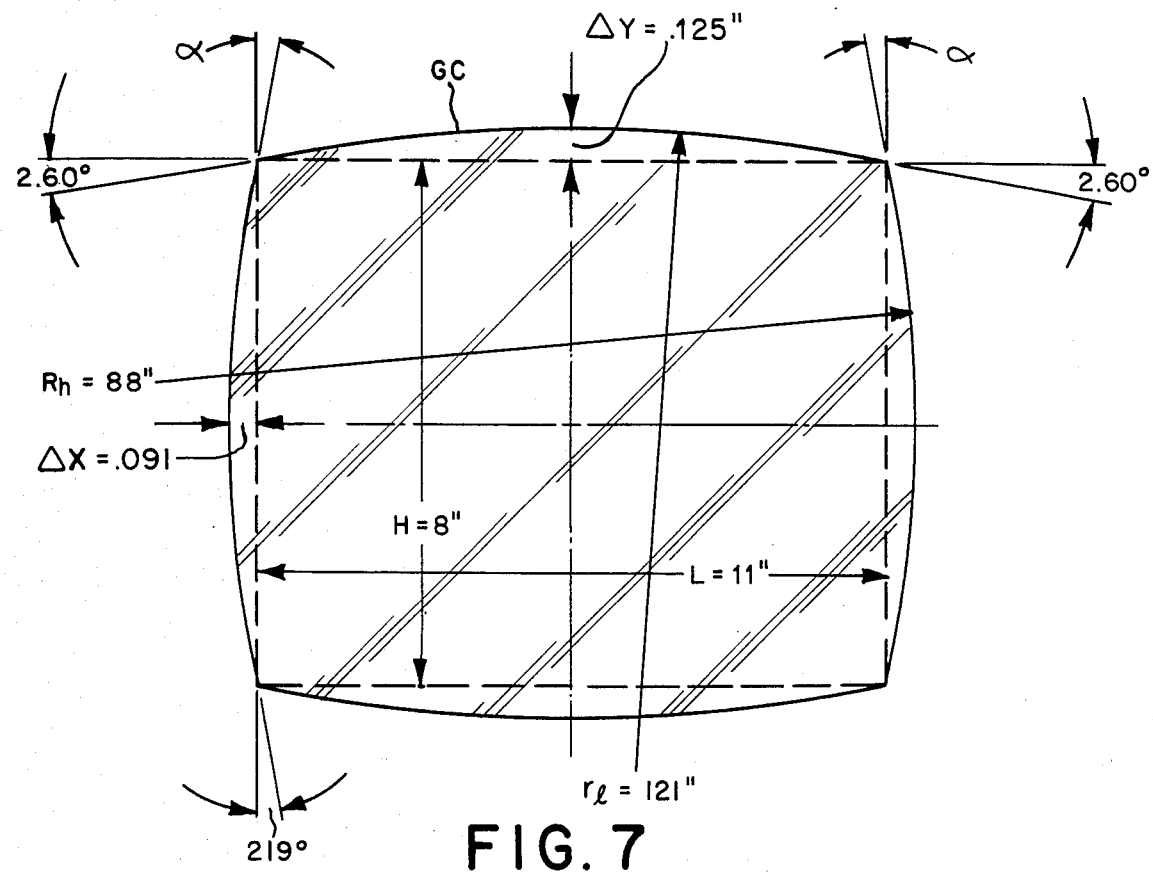
FIG. 7 is a depiction of the geometry of great circle paths across a spherical surface.

The depictions of such a coordinate system in FIGS. 6 and 7 are, to some extent, exaggerated in order to more clearly illustrate the principles of ray trajectories. In practice the actual angles $\phi$ max and $\psi$ max are small. For the tube mentioned above, $\phi$max=14.3° and $\psi$max=10.4° and the error introduced by writing $\phi$ instead of sin $\phi$ is at most 1%, less than that in the case of $\psi$. This approximation is used in the following.

A sound ray, e.g., a surface acoustic wave (SAW), will, as stated, by its nature follow a great circle route. Since meridians are great circles, while parallels are not, a sound ray originating at x=0,y=H/2, or $\phi=0$, $\psi=0.5H/R$, and directed eastward will follow the dash line GC and cross the equator at $\phi=\pi/2$, $\psi=0$. The true height y of the ray above the equatorial plane follows a cosine law:

$$y = H/2 \text{ con } x/R \tag{1}$$

At the extreme right of the faceplate:
$\phi_{max}=14.3$ degrees;
Therefore, cos $\phi_{max}=0.969$ Accordingly, a ray directed straight east, and starting at x=0, y=H/2, drops by a factor of 1-cos $\phi_{max}$ which is equal to 0.031 times its original height of 4.0", or a drop of $\Delta y=0.125$" and the radius of the circle formed by the eastbound ray (as seen from a far away point in the equatorial plane at zero degrees longitude) is: $r_l=2R^2/H$.

Similarly, if the coordinate system were rotated 90 degrees and the length L substituted for the height, the radius of a northbound ray starting at x=L/2, y=0, would be $r_h=2R^2/L$.

For the 13" CRT schematically depicted in FIG. 7 these radii are found to be:
For the horizontal (length) edge: $r_l=2R^2/H=121$"
For the vertical (height) edge: $r_h=2R^2/L=88$"
The droop (barrel distortion) is:
For the horizontal edge: $|\Delta y|=Hl^2/16R^2=0.125$"
For the vertical edge: $|\Delta X|=H^2L/16R^2=0.091$"
The total turning angle along the edge,
for either edge: $L/r_l=H/r_h=LH/2R^2=0.091$ rad.=5.21°

Therefore, the angles designated in FIG. 7 are both 2.60°. It would appear that the angles between the east-west great circles and the meridians in the four corners of FIG. 7 are each 90°+2α. This, however, is an artifact of perspective; on the actual surface, as seen by an observer located above a particular corner, the meridian and the great circle intersecting at that corner appear to be straight lines which cross at an angle very close to 90°+α, or 92.6° in the example above.

BIRADIALLY CURVED SURFACE RAY TRAJECTORY

Certain CRT faceplates depart from a true spherical shape in that they have less curvature (larger radius) along the horizontal axis than along the vertical axis. The question presented then is what corrections will be required for the arrays of reflective elements utilized in a SAW touch system for a biradially surfaced CRT.

Strictly speaking, a biradial surface does not exist since it is not possible for a surface of finite extent to maintain two different but constant radii of curvature in orthogonal directions unless one radius is infinite (i.e., a cylinder). However, if one of the two radii (or both if desired) need not remain exactly constant, a finite surface is possible. Consider, for instance, the outer rim of a toroid; the larger radius varies only very little across the width of the rim while the smaller radius may well be constant.

A similar type of surface also exists on an ellipsoid having equal axes a, b and a different (longer or shorter) axis c.

Figure 8:
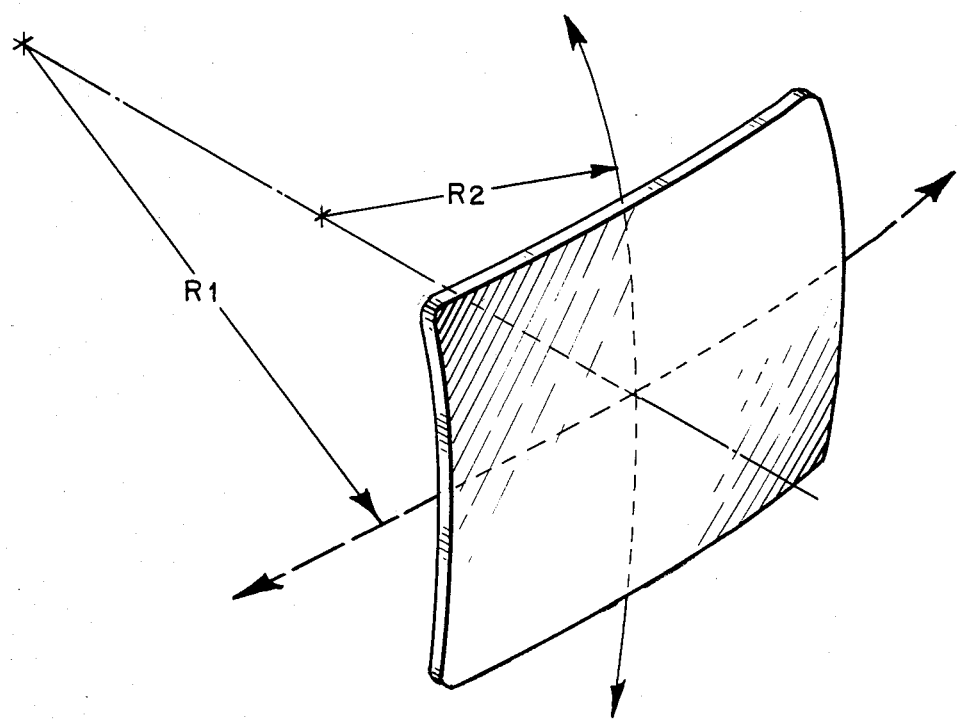
FIG. 8 is a perspective rendition of a biradial surface in the form of a sector of a toroid.

Referring to FIG. 8 there is depicted a short sector of a toroid, specifically, a rectangular-like section which has a radius $R_1$ in a longitudinal direction and a radius $R_2$ in a latitudinal direction and in which $R_2$ varies from a predetermined value at the horizontal centerline to just a little less at the upper and lower edges. This difference may be neglected.

The two circles that would terminate the left and right ends of a toroid sector would appear in perspective as ellipses having an unchanged vertical half-axis a=$R_1$, but a horizontal half-axis b foreshortened by the factor $0.5L/R_2$, thus b=$0.5R_1L/R_2$. From geometry, the radius of curvature of an ellipse at its intersection with its minor axis is $a^2/b$, hence the apparent radius of curvature of the left and right edges, as seen by an observer located centrally at a far distance, is $R_1^2R_2/(0.5R_1L)=2R_1R_2/L$.

This equation agrees nicely with the value $2R^2/L$ developed earlier for the spherical surface, and it goes to infinity if either radius is infinite (cylinder).

With reference to the expressions developed earlier for the spherical case, we have by analogy:

$r_h=2R_1R_2/L$ $r_l=2R_1R_2/H$

Barrel distortion:
Horizontal edge $|\Delta y| = HL^2/16R_1R_2$
Vertical edge $|\Delta x| = H^2L/16R_1R_2$
Total turning angle along an edge:

$$L/r_l = H/r_h = LH/2R_1R_2$$

In summary, what this establishes is that in calculating errors, angles or corrections, the biradial surface can be considered spherical with an effective radius which is the geometric mean of $R_1$ and $R_2$: $Reff = \sqrt{R_1R_2}$

REFLECTIVE ARRAYS FOR THREE-DIMENSIONALLY CURVED SURFACES

One will note that the time required for the surface wave burst components to propagate across the panel is not constant for all burst paths. This, of course, is attributable to the fact that, for the three-dimensionally curved substrate surfaces herein considered, the surface waves must travel longer paths across the center of surface 16 than they travel across the sides of that surface. However, the time required for the surface wave burst launched by the input transducer to propagate to the point at which it is again redirected across the panel, and from the point at which it is redirected to the output transducer, varies along the coordinate axis along which the touch may occur. It is this varying distance, and the surface wave propagation time associated therewith, which are utilized to locate the position of a touch along the coordinate axis.

Surface acoustic wave trajectories on the open curved surface of a facepanel will always follow great circle routes. Therefore, in order to steer the wave trajectories along paths which best approximate the horizontal and vertical directions, the constituent elements of the reflective grating and/or their orientation relative to the trajectory path are selectively tailored.

Figure 9:
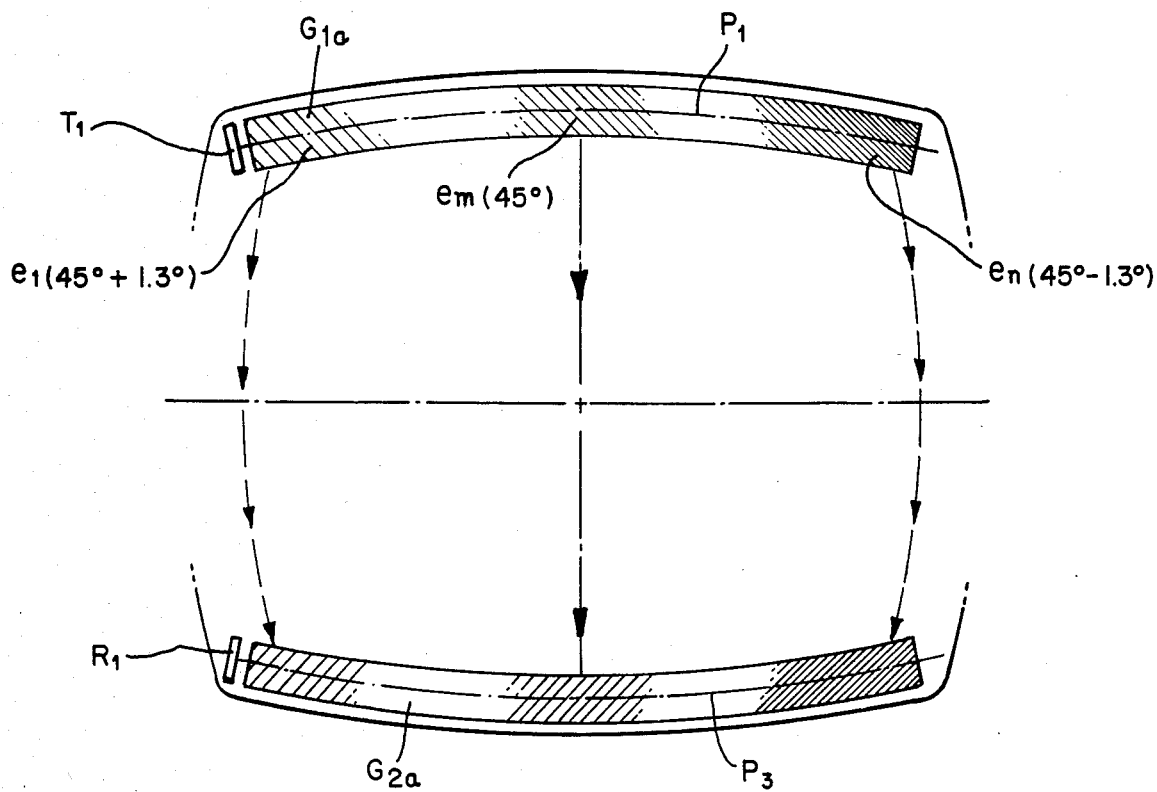
FIG. 9 is a detail of a surface wave reflective array in which elements are selectively angled relative to the longitudinal axis of the array along a great circle.

See FIG. 9. A first solution to the problem for the assumed case of a 13" CRT, contemplates disposing the longitudinal axis of a first reflective grating G1a along the great circle path P1 across the top of the surface 16 of faceplate 18 (FIG. 2). As noted, FIGS. 2 and 7 represent a CRT faceplate as viewed by a distant observer located at $\phi = 0$ $\psi = 0$. In like manner, FIG. 9 represents a grating pattern as it would appear to the same observer. This is the pattern which could actually be used in one method of fabricating the grating, e.g., by a silk screening process in which the spherical faceplate is rolled along a flat screen.

Grating G1a serves to direct surface wave components derived from the burst applied to transducer T1 across surface 16 in a progression of transverse (meridional) paths which intersect, at 90 degrees, a coordinate axis coincident with the major axis of faceplate 18. In this execution transducer T1 is disposed perpendicular to the great circle route, i.e., path P1. In order to redirect the incident waves along meridional paths, all the reflector elements (save the midpoint one) are tilted with respect to the 45 degree orientation normally employed in a grating of the type applied to a flat substrate. Thus, while the array's mid-point element $e_m$ is disposed at substantially 45 degrees to the longitudinal axis of path P1, elements located between transducer T1 and the midpoint are disposed, successively, at linearly varying angles to the P1 axis ranging from 45 degrees plus 1.30 degrees at the transducer end of the array to 45 degrees at the midpoint. Continuing, the elements located between the midpoint and the distal end of the array are disposed, successively, at linearly varying angles to the P1 axis ranging from 45 degrees at midpoint to 45 degrees minus 1.30 degrees at the distal end. In order to obtain cumulative interference, i.e., waves reflected by adjacent elements being of the same phase, the spacing between such elements as measured along path P1 must be $\Delta x = \lambda/2 \sin^2(\alpha/2)$ where $\lambda$ is the wavelength and $\alpha$ the angle between incident and reflected ray paths. The angle between ray paths and each reflecting element, as in the case of a plane mirror, is $\alpha/2$. At the center of the grating, $\alpha/2 = 45°$, hence $\Delta x = \lambda$. However, everywhere else corrections must be made: at the end nearest the transducer, $\alpha/2 = 46.3°$ and $\Delta x = 0.96\lambda$, and at the distal end, $\alpha/2 = 43.7°$, $\Delta x = 1.05\lambda$. The element spacing at other points varies in accordance with the linearly changing angle $\alpha/2$. The construction of an associated grating G2a, which would be disposed along path P3 is, of course, a mirror image of grating G1a. Moreover, the deletion of elements in each of arrays G1a and G2 can adopt the practice described above in connection with the discussion on deletion of array elements.

While this is a viable solution to achieving the desired 90 degree intersection between the wave component transverse paths and the coordinate axis, as depicted in FIG. 2, it is also evident that, because of the difference in path lengths, the transit time for a wave component is greater at the center of the panel that it is at the left and right edges. In other words, the curvature of arrays G1a and G2a (the fact that they are great circles rather than parallels) distorts the time scale so that uniformly spaced meridional positions no longer correspond to uniformly spaced time intervals, as is the case in which straight arrays are disposed upon a flat substrate.

Figure 10:
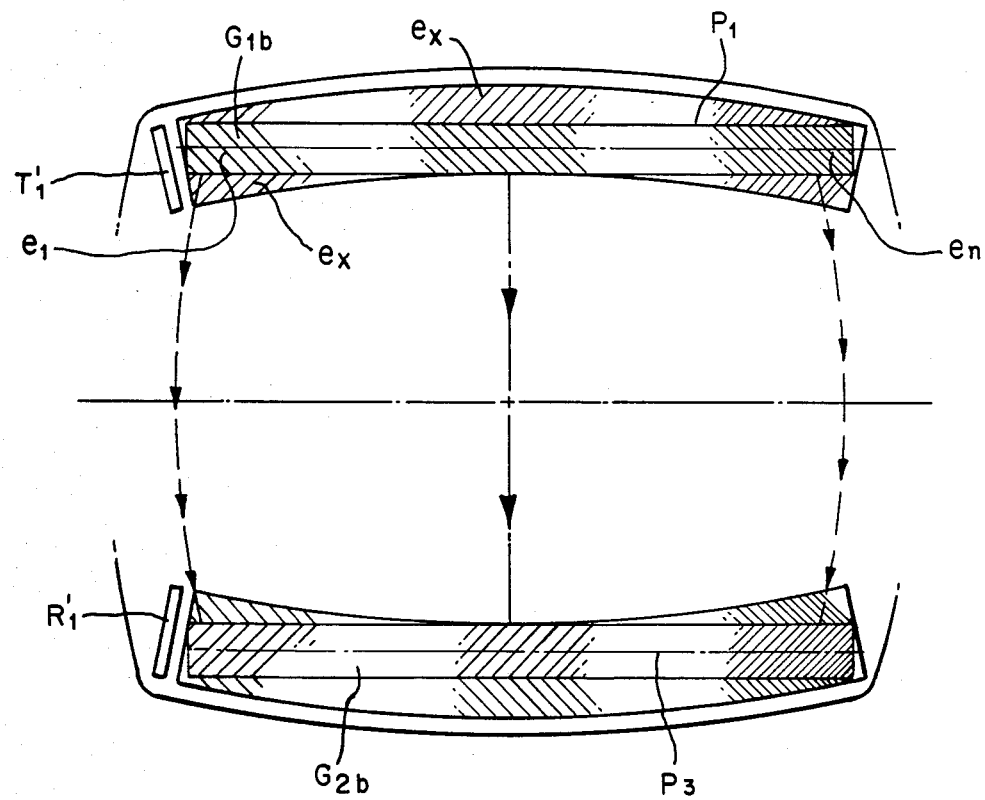
FIG. 10 is a detail of a surface wave reflective array in which elements are selectively arranged along a parallel.

The disparity in transmit time will, in many cases, only causes a negligible error. It may, however, be readily resolved by programming the computer in controller 14 to apply, as a function of time elapsed after the transmitted burst, parabolic correction to the electrical signals derived from the wave components received by receiver transducer R1. In other words, in place of the linear relationship between the position x and time t, say $x = A + Bt$ which applies to a flat faceplate, the computer uses the relationship $x = A' + B't + Ct^2$, where A, B, A', B' and C are constants. The need for such parabolic corrections is avoided by transversely repositioning the reflective elements of a grating G1b so that, while maintaining the angles and spacings just described, the elements are now located along a parallel instead of a great circle. This is shown in FIG. 10 which is drawn from the same viewpoint as FIG. 9. Compared to FIG. 9, the transducer T1' and the strip occupied by the reflecting elements are made wider in order to accommodate the curvature of the parallels (0.125" wider for the horizontal grating and 0.091" wider for the vertical, in the example given earlier).

Transducer T1' is made wide enough to accommodate the entire strip. To equalize the attention and phase shift between the curved area and the adjacent marginal areas, each reflecting element is extended into the marginal area in such a manner that incident waves reflected by the extensions $e_x$ are discarded.

Figure 11:
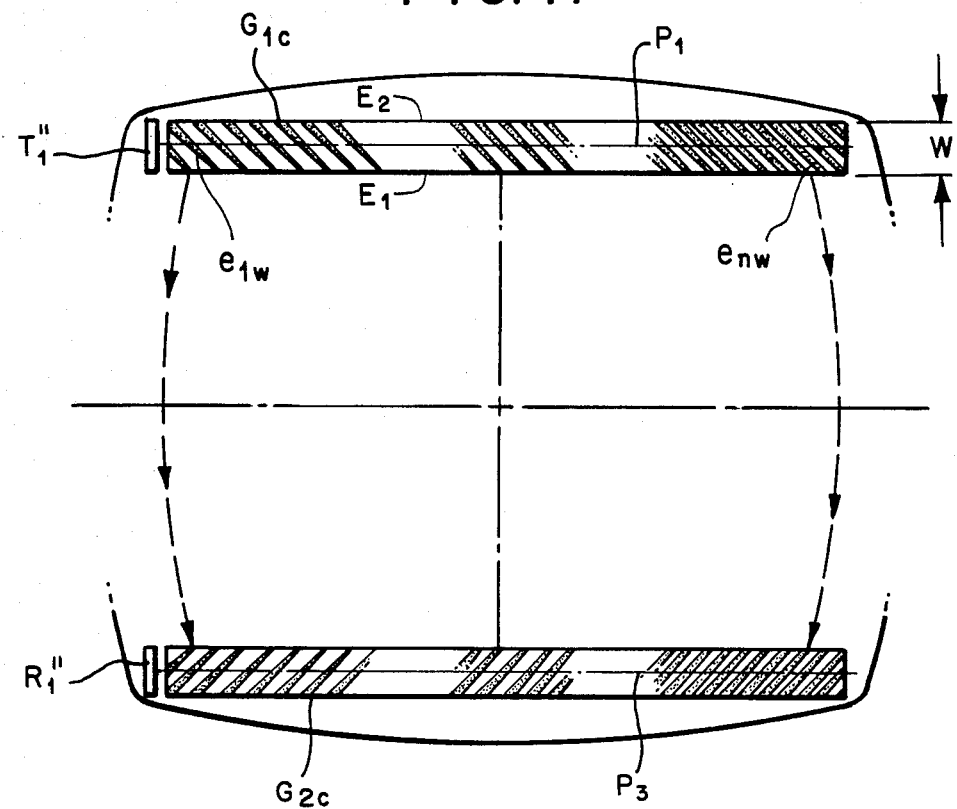
FIG. 11 is a detail of a reflective array in which elements are so configured as to establish a gradient of surface wave velocity transversely across the array.

FIG. 11, drawn from the same viewpoint as FIGS. 9 and 10, shows an alternative way of disposing a reflective array along a parallel rather than along a great circle. The longitudinal axis of array G1c is coincident with a parallel across the curved substrate and transducer T1″ is disposed perpendicular to that axis. However, inside the array the wave burst must be continually steered outward in order to confine the wave burst to the path defined by the parallel. For the example previously used, the turning rate for the horizontal array is 0.521 degrees per inch. In an array G1c having a width W, the inside edge $E_1$ must sustain a higher wave velocity than the outside edge $E_2$ by the fraction W/r where, as developed above, $r_l = 2R^2/H$.

For the horizontal array in the example, with W = 0.5″: the fraction = 0.5/121 = 0.0041 or 0.41%

In practice this effect may be achieved by depositing on the outside portion of the grating area, i.e., the space between the center line and the edge $E_2$, a coating which tends to reduce the velocity of surface waves below that which characterizes the uncoated substrate. Such a coating need not be continuous; if the reflective gratings are made of a material which reduces the surface wave velocity, the gratings themselves may be modified to achieve the desired velocity gradient. Such an arrangement is shown in FIG. 11, where the reflecting elements $e_{lw}$–$e_{nw}$ are wedge-shaped.

Array G2c, which redirects wave components directed thereto from array G1c, is formed as a mirror image of array G1b. Again, the spacing and deletion of elements in each of arrays G1c and G2c can also adopt the practice described above in the discussion on deletion of array elements. To achieve a uniform rate of bending the acoustic beam, the wedge shape must be more pronounced in the region close to the transducer where many elements have been deleted. This is shown in FIG. 11.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined by the following claims when viewed in their proper perspective against the prior art.

I claim:

1. In a touch control system for a cathode ray tube, display panel or other touch-controlled device which is capable of recognizing touch positions along a predetermined coordinate axis on a three dimensionally curved touch surface, the apparatus comprising:
   a substrate comprising a sector of a three dimensionally curved surface having a touch surface capable of propagating surface acoustic waves such that a touch on said surface causes a perturbation of a surface wave propagating through the region of the touch;
   input surface wave transducer means mechanically and acoustically coupled to said touch surface of said substrate and useful when excited for launching a burst of surface acoustic waves on said touch surface along a first path which represents a great circle on said surface; and
   means including an array of surface wave reflective elements disposed in or on said touch surface of said substrate along said first path for directing wave components derived from said burst across said touch surface of said substrate in a progression of transverse paths intersecting said coordinate axis.

2. In a touch control system for a cathode ray tube, display panel or other touch-controlled device which is capable of recognizing touch positions along a predetermined coordinate axis on a three dimensionally curved touch surface, the apparatus comprising:
   a substrate comprising a sector of a three dimensionally curved surface having a touch surface capable of propagating surface acoustic waves such that a touch on said surface causes a perturbation of a surface wave propagating through the region of the touch;
   input surface wave transducer means mechanically and acoustically coupled to said touch surface of said substrate and useful when excited for launching a burst of surface acoustic waves on said touch surface along a first path which represents a great circle on said surface;
   means including an array of surface wave reflective elements disposed in or on said touch surface of said substrate along said first path for directing wave components derived from said burst across said touch surface of said substrate in a progression of transverse paths intersecting said coordinate axis, the curvature of said first path relative to said axis creating propagation time differences between said wave components;
   and means for compensating for said propagation time differences.

3. In a touch control system for a cathode ray tube, display panel or other touch-controlled device which is capable of recognizing touch positions along a predetermined coordinate axis on a three dimensionally curved touch surface, the apparatus comprising:
   a substrate comprising a sector of a three dimensionally curved surface having a touch surface capable of propagating surface acoustic waves such that a touch on said surfaces causes a perturbation of a surface wave propagating through the region of the touch;
   input surface wave transducer means mechanically and acoustically coupled to said touch surface of said substrate and useful when excited for launching a burst of surface acoustic waves on said touch surface along a first path which represents a great circle on said surface; means including an array of surface wave reflective elements disposed in or on said touch surface of said substrate along said first path for directing wave components derived from said burst across said touch surface of said substrate in a progression of transverse paths intersecting said coordinate axis; and
   means for causing said wave components to exit said array so as to intersect said coordinate axis at substantially ninety degrees.

4. In a touch control system for a cathode ray tube, display panel or other touch-controlled device which is capable of recognizing touch positions along a predetermined coordinate axis on a three dimensionally curved touch surface, the apparatus comprising:
   a substrate comprising a sector of a three dimensionally curved surface having a touch surface capable of propagating surface acoustic waves such that a touch on said surface causes a perturbation of a surface wave propagating through the region of the touch;

input surface wave transducer means mechanically and acoustically coupled to said touch surface of said substrate and useful when excited for launching a burst of surface acoustic waves on said touch surface along a first path having a longitudinal axis which represents a great circle on said surface;

means including an array of surface wave reflective elements disposed in or on said touch surface of said substrate along said first path for directing wave components derived from said burst across said touch surface of said substrate in a progression of transverse paths intersecting said coordinate axis; and means for causing said wave components to exit said array so as to intersect said coordinate axis at substantially ninety degrees, characterized by said array having non-parallel elements selectively individually angled relative to the longitudinal axis of the array such as to cause said wave components to have said substantial parallelism.

5. Apparatus as set forth in claim 4 in which the spacing $\Delta x$ between adjacent reflective elements, as measured along said first path, is defined as $\Delta x = \lambda/2 \sin^2(\alpha/2)$ where $\lambda$ is wavelength and $\alpha$ is the angle between incident and reflecting waves.

6. The apparatus defined by claim 4 wherein said array has at least the middle element disposed at approximately 45 degrees to the longitudinal axis of said first path, wherein said array has elements located between the transducer end of said array and the midpoint of said array disposed, successively, at linearly varying angles to said longitudinal axis ranging from an angle greater than 45 degrees to an angle of approximately 45 degrees, and wherein said array has elements located between said midpoint of said array and the distal end of said array disposed, successively, at linearly varying angles to said longitudinal axis ranging from approximately 45 degrees to an angle less than 45 degrees.

7. In a touch control system for a cathode ray tube, display panel or other touch-controlled device which is capable of recognizing touch positions along a predetermined coordinate axis on a three dimensionally curved touch surface, the apparatus comprising:

a substrate comprising a sector of a three dimensionally curved surface having a touch surface capable of propagating surface acoustic waves such that a touch on said surface causes a perturbation of a surface wave propagating through the region of the touch;

input surface wave transducer means mechanically and acoustically coupled to said touch surface of said substrate and useful when excited for launching a burst of surface acoustic waves on said touch surface along a first path centered upon a great circle on said surface;

means including an array of surface wave reflective elements disposed in or on said touch surface of said substrate along said first path for directing wave components derived from said burst across said touch surface of said substrate in a progression of transverse paths intersecting said coordinate axis, said array lying fully within said path and maintaining throughout its length a constant spacing from said coordinate axis so as to avoid the creation of propagation time differences between said wave components attributable to the non-parallelism between said first great circle path and said coordinate axis.

8. The apparatus defined by claim 7 wherein phase equalization elements are disposed in said arcuate great circle path of said surface acoustic waves in the region or regions not occupied by said array elements.

9. In a touch control system for a cathode ray tube, display panel or other touch-control device which is capable of recognizing touch positions along a predetermined coordinate axis on a three dimensionally curved touch surface, the apparatus comprising:

a substrate comprising a sector of three dimensionally curved surface having a touch surface capable of propagating surface acoustic waves such that a touch on said surface causes a perturbation of a surface wave propagating the through the region of the touch;

input surface wave transducer means mechanically and acoustically coupled to said touch surface of said substrate and useful when excited for launching a burst of surface acoustic waves on said touch surface along a first path maintaining a constant spacing from said coordinate axis; and means including an array of surface wave reflective elements disposed in or on said touch surface of said substrate along said first path and configured and arranged to steer a burst of surface waves traveling through the array so as to remain therewithin until reflected, said reflective elements directing wave components derived from said burst across said touch surface of said substrate in a progression of paths disposed substantially transverse to said coordinate axis.

10. The apparatus as set forth in claim 9 in which said first path is characterized by a longitudinal axis that coincides with a parallel on said substrate surface sector, and in which elements of said array are so configured as to establish a gradient of surface wave velocity transversely across said array for effectively steering said burst along said parallel and defeating the natural tendency of surface waves propagating through said array to follow a great circle route.

11. For use with a cathode ray tube, display panel or other touch-control device, a system which is capable of recognizing touch positions along a predetermined coordinate axis on a touch surface of such tube, panel or device, said system comprising:

a substrate comprising a sector of a three dimensionally curved surface having a touch surface capable of propagating surface acoustic waves such that a touch on said surface causes a perturbation of a surface wave propagating through the region of the touch;

input surface wave transducer means mechanically and acoustically coupled to said touch surface of said substrate for launching a timed succession of surface acoustic wave bursts on said touch surface along a first path which represents a great circle on said surface;

output surface wave transducer means mechanically and acoustically coupled to said touch surface of said substrate at the terminus of a second path, which also represents a great circle on said surface, for receiving components of said timed succession of surface wave bursts;

means including a first array of surface wave reflective elements disposed in or on said touch surface of said substrate along said first path for directing wave components derived from said burst across said touch surface of said substrate in a progression of transverse paths intersecting said coordinate axis and respectively associated with different positions along said coordinate axis on said touch surface;

means including a second array of surface wave reflective elements disposed in or on said touch surface of said substrate along said second path for intercepting said wave components traveling said transverse paths and for redirecting said intercepted components toward said output transducer; and circuit means coupled to said input and output transducer means for initiating said timed succession of surface wave bursts on said substrate surface and for detecting touch-induced perturbations of received wave burst components, said circuit means including means coupled to said output transducer means for developing an electrical amplitude characterization of said perturbation and for developing an output representing the timing of said characterization of said perturbation, and thus determining which of said transverse paths was traversed by a touch-perturbed wave component and thereby the location of the touch along said coordinate axis of said touch surface.

12. For use with a cathode ray tube, display panel or other touch-controlled device, a system which is capable of recognizing touch positions along a predetermined coordinate axis on a touch surface of such tube, panel or device, said system comprising:

a substrate comprising a sector of a three dimensionally curved surface having a touch surface capable of propagating surface acoustic waves such that a touch on said surface causes a perturbation of a surface wave propagating through the region of the touch;

input surface wave transducer means mechanically and acoustically coupled to said touch surface of said substrate for launching a timed succession of surface acoustic wave bursts on said touch surface along a first path which represents a great circle on said surface;

output surface wave transducer means mechanically and acoustically coupled to said touch surface of said substrate at the terminus of a second path, which also represents a great circle on said surface, for receiving components of said timed succession of surface wave bursts;

means including a first array of surface wave reflective elements disposed in or on said touch surface of said substrate along said first path for directing wave components derived from said burst across said touch surface of said substrate in a progression of transverse paths intersecting said coordinate axis and respectively associated with different positions along said coordinate axis on said touch surface, the curvature of said first path relative to said coordinate axis creating propagation time differences between wave components;

means including a second array of surface wave reflective elements disposed in or on said touch surface of said substrate along said second path for intercepting said wave components traveling said transverse paths and for redirecting said intercepted components toward said output transducer, the curvature of said second path relative to said coordinate axis also creating propagation time differences between wave components; and circuit means coupled to said input and output transducer means for initiating said timed succession of surface wave bursts on said substrate surface and for detecting touch-induced perturbations of received wave burst components, said circuit means including means for compensating for said propagation time difference.

13. The system as set forth in claim 12 in which said means for compensating for said propagation time difference comprises means for applying, as a function of time elapsed after initiation of said input surface wave burst, a parabolic correction to the electrical signals derived from said surface wave components received by said output surface wave transducer means.

14. The system defined by claim 12 wherein said circuit means further includes means for determining, by an analysis based on the transit time of the detected perturbed wave component, which of said transverse paths was traversed by touch-perturbed component and thereby the location of the touch along said coordinat axis of said touch surface.

15. For use with a cathode ray tube, display panel or other touch-controlled device, a system which capable of recognizing touch positions along a predetermined coordinate axis on a touch surface of such tube, panel or device, said system comprising:

a substrate comprising a sector of a three dimensionally curved surface having a touch surface capable of propagating surface acoustic waves such that a touch on said surfaces causes a perturbation of a surface were propagating through the region of the touch;

input surface wave transducer means mechanically and acoustically coupled to said touch surface of said substrate for launching a timed succession of surface acoustic wave bursts on said touch surface along a first path which represents a great circle on said surface;

output surface wave transducer means mechanically and acoustically coupled to said touch surface of said substrate at the terminus of a second path, which also represents a great circle on said surface, for receiving components of said timed succession of surface wave bursts;

means including a first array of surface wave reflective elements disposed in or on said touch surface of said substrate along said first path for directing wave components derived from said burst across said touch surface of said substrate in a progression of transverse paths intersecting said coordinate axis and respectively associated with different positions along said coordinate axis on said touch surface;

means for causing said wave components to exit said first array so as to intersect said coordinate axis at substantially ninety degrees so that said first array is characterized by having non-parallel elements selectively individually angled relative to the longitudinal axis of said first array such as to cause said wave components to have substantial parallelism;

means including a second array of surface wave reflective element disposed in or on said touch surface of said substrate along said second path for intercepting said wave components traveling said transverse paths and for redirecting said intercepted components toward said output transducer;

means for causing said wave components to enter said second array after exiting said coordinate axis at substantially ninety degrees so that said second array is characterized by having non-parallel elements selectively individually angled relative to the longitudinal axis of said second array such as to cause said wave components to have substantial parallelism;

circuit means coupled to said input and output transducer means for initiating said timed succession of surface wave bursts on said substrate surface and for detecting touch-induced perturbations of received wave burst components, said circuit means including means coupled to said output transducer means for developing an electrical amplitude characterization of said perturbation and for developing an output representing the timing of said characterization of said perturbation, and thus determining which of said transverse paths are traversed by a touch-perturbed wave component and thereby the location of the touch along said coordinate axis of said touch surface.

16. For use with a cathode ray tube, display panel or other touch-controlled device, a system which is capable of recognizing touch positions along a predetermined coordinate axis on a touch surface of such tube, panel or device, said system comprising:

a substrate comprising a sector of a three dimensionally curved surface having a touch surface capable of propagating surface acoustic waves such that a touch on said surface causes a perturbation of a surface wave propagating through the region of the touch;

input surface wave transducer means mechanically and acoustically coupled to said touch surface of said substrate for launching a timed succession of surface acoustic wave bursts on said touch surface along a first path centered upon a great circle on said surface;

output surface wave transducer means mechanically and acoustically coupled to said touch surface of said substrate at the terminus of a second path, which also represents a great circle on said surface, for receiving components of said timed succession of surface wave bursts;

means including a first array of surface wave reflective elements disposed in or on said touch surface of said substrate along said first path for directing wave components derived from said burst across said touch surface of said substrate in a progression of transverse paths intersecting said coordinate axis and respectively associated with different positions along said coordinate axis on said touch surface said array lying fully within said first path and maintaining throughout its length a constant spacing from said coordinate axis so as to avoid differences between said wave components attributable to the non-parallelism between said first great circle path and said coordinate axis;

means including a second array of surface wave reflective elements disposed in or on said touch surface of said substrate along said second path for intercepting said wave components traveling said transverse paths and for redirecting said intercepted components toward said output transducer, said second array being substantially a mirror structural image of said first array; and circuit means coupled to said input and output transducer means for initiating said timed succession for surface wave bursts on said substrate surface and for detecting touch-induced perturbations of received wave burst components;

said circuit means including means coupled to said output transducer means for developing an electrical amplitude characterization of said perturbation and for developing an output representing the timing of said characterization of said perturbation, and thus determining which of said transverse paths are traversed by a touch-perturbed wave component and thereby the location of the touch along said coordinate axis of said touch surface.

17. For use with a cathode ray tube, display panel or other touch-controlled device, a system which is capable of recognizing touch positions along a predetermined coordinate axis on a touch surface of such tube, panel or device, said system comprising:

a substrate comprising a sector of a three dimensionally curved surface having a touch surface capable of propagating surface acoustic waves such that a touch on said surface causes a perturbation of a surface wave propagating through the region of the touch;

input surface wave transducer means mechanically and acoustically coupled to said touch surface of said substrate for launching a timed succession of surface acoustic wave bursts on said touch surface along a first path maintaining a constant spacing from said coordinate axis;

output surface wave transducer means mechanically and acoustically coupled to said touch surface of said substrate at the terminus of a second path, which also extends in the general direction of said coordinate axis, for receiving components of said timed succession of surface wave bursts;

means including a first array of surface wave reflective elements disposed in or on said touch surface of said substrate along said first path and configured and arranged to steer a burst of surface waves traveling through said first array so as to remain therewithin until reflected, so that wave components derived from said burst are directed across said touch surface of said substrate in a progression of transverse paths intersecting said coordinate axis and respectively associated with different positions along said coordinate axis on said touch surface;

means including a second array of surface wave reflective elements disposed in or on said touch surface of said substrate along said second path and configured and arranged to assure interception of said wave components traveling said transverse paths and for redirecting said intercepted components toward said output transducer; and circuit means coupled to said input and output transduce means for initiating said timed succession of surface wave bursts on said substrate surface and for detecting touch-induced peturbations of received wave burst components, said circuit means including means coupled to said output transducer mean for developing an electrical amplitude characterization of said perturbation and for developing an output representing the timing of said characterization of said perturbation, and thus determining which of said transverse paths was traversed by a touch-perturbed wave component and thereby the location of the touch along said coordinate axis of said touch surface.

* * * * *